(No Model.)
L. O. ORTON.
MACHINE FOR SHARPENING SAWS.
No. 339,576. Patented Apr. 6, 1886.
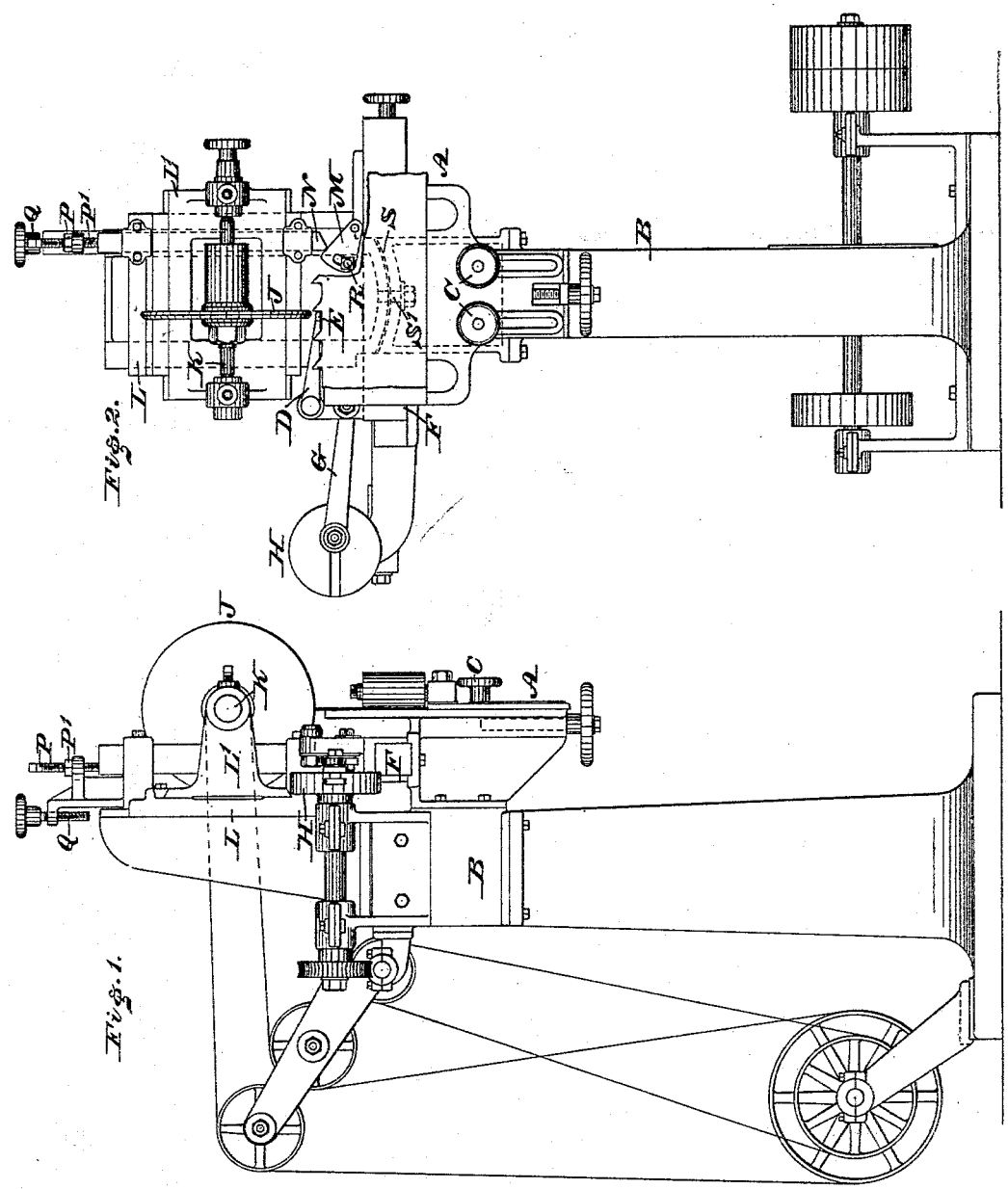
WITNESSES:
Th. Rolle.
W. F. Kircher.
INVENTOR
Lyman O. Orton
BY John A. Wiedersheim
ATTORNEY

UNITED STATES PATENT OFFICE.

LYMAN O. ORTON, OF PHILADELPHIA, PENNSYLVANIA.

MACHINE FOR SHARPENING SAWS.

SPECIFICATION forming part of Letters Patent No. 339,576, dated April 6, 1886.

Application filed August 6, 1885. Serial No. 173,683. (No model.)

*To all whom it may concern:*

Be it known that I, LYMAN O. ORTON, a citizen of the United States, residing in the city and county of Philadelphia, State of Pennsylvania, have invented a new and useful Improvement in Machines for Sharpening Saws, which improvement is fully set forth in the following specification and accompanying drawings, in which—

Figure 1 represents a side elevation of a machine for sharpening saws, embodying my invention. Fig. 2 represents a front view thereof, partly broken away.

Similar letters of reference indicate corresponding parts in the two figures.

My invention consists of a saw-sharpening machine provided with means for advancing the saw and causing the motions of the sharpening-wheel and of said saw to accord with the contour of the teeth, as will be hereinafter fully set forth.

Referring to the drawings, A represents a support for a saw, the same being connected with a frame, B, by means of screws C, whereby said support is vertically adjustable, it being noticed that the saw is suitably sustained in upright position and has its back edge resting on said support.

D represents a dog, which has a finger, E, at its front end for engagement with the teeth of the saw, said dog being pivoted to a slide, F, to which motion is imparted by a rod, G, and crank-wheel H, the latter being mounted on the frame B and receiving power from suitable gearing, said slide F being guided on the frame B and moving in a direction parallel with the saw.

On the upper part of the frame B is a grinding or sharpening wheel, J, which rotates at a right angle to the saw over the teeth thereof, and has its arbor or shaft K mounted on a sliding frame of a rising and falling head, L, which is supported and guided on the upper part of the frame B, said wheel being rotated by a band and band-wheels, or other suitable gearing or means.

On the slide F is a piece, M, having an inclined upper face and adapted for raising the head L, and consequently the wheel J, said piece M having resting on it the lower end of a vertical rod or bar, N, which is attached to the head L, it being noticed that said bar is adjustable in a vertical direction by means of a screw, P, and nut P', the screw being fitted to an arm on the head L and engaging with the top of the bar, and said head is also vertically adjustable by means of a screw, Q, which is fitted to an arm of said head and adapted to abut against the upper part of the frame B. The piece M is pivoted at one end to the slide F and provided with a segmental slot, through which passes a bolt, R, which is secured to the slide, whereby the piece may be raised and lowered. The connection of the rod G with the wheel H is adjustable, so as to increase or decrease the throw of the dog D. The head L has a sliding frame, L', the same carrying the bearings for the axis or arbor K of the wheel J, and made movable to the right or left, the wheel following the lateral motions of the frame, it being noticed that the several parts as described admit of the adjustment of the device or machine for sharpening saws of different sizes. Furthermore, the upper portion of the frame B, which sustains the head L, is made in sections, the contiguous parts being segmental, as at S, Fig. 2, and connected as one by a bolt, S'. By this provision, when the bolt is loosened, the upper portion of the frame may be turned on the lower portion, and the wheel J set at different angles to the line of the saw-teeth.

It will be seen that when the machine is in operation, the parts being in position shown in Fig. 2, the dog returns and rides over the next tooth and drops behind the same, so as to advance the saw the distance of one tooth. The wheel is at the same time gradually lowered and grinds or sharpens the straight or cutting part of the tooth with which it comes in contact. The saw is now advanced by the dog and the wheel grinds the edge of the saw in the space between adjacent teeth. The piece M then bears against the bar N and raises the wheel, and as the saw advances the inclined edge or back of the next tooth comes in contact with the wheel as the latter rises, and thus said edge is ground or sharpened. The slide now returns and the dog follows the same to take hold of another tooth. Meanwhile, owing to the movement of the piece M with the slide, the wheel J descends and grinds or sharpens the straight side of the tooth, after which the saw is advanced and the other operations hereinbefore stated are repeated.

Having thus described my invention, what I claim as new, and desire to secure by Letters Patent, is—

1. In a saw-grinding machine, the slide F, having suitable ways in the frame B, and provided with the dog D, with finger E, and adapted to move in a parallel direction to a saw held in a support on the frame B, in combination with the connecting-rod G, crank-wheel H, means for rotating said wheel H, and a vertically-adjustable saw-support, substantially as described.

2. In a saw grinding or sharpening machine, the combination of a grinding or sharpening wheel mounted on a rising and falling frame or head and a slide mounted on the frame of the machine provided with an inclined piece engaging with said head for raising and lowering the wheel, substantially as described.

3. The slide F, having a piece, M, pivoted thereto, in combination with the rising and falling head L, bar N, screw P, and nut P', substantially as and for the purpose set forth.

4. The slide F, having a piece, M, in combination with means, substantially as described, to operate said slide, the head L, having a bar, N, and the frame L', having a bearing for the axis K, carrying the grinding-wheel J, substantially as described.

5. The slide F, having a piece, M, in combination with means, substantially as described, for operating said slide, the rising and falling head L, having a bar, N, the frame O, having bearings for the shaft K, carrying the grinding-wheel J, and the frame B, having its upper portion formed of segmental sections joined by the bolt S', substantially as and for the purpose set forth.

6. In a grinding or sharpening machine, the combination of a rising and falling grinding or sharpening wheel and a slide provided with an adjustable lifting-piece which engages with the supporting frame or head of said wheel, substantially as described.

7. A saw-grinding machine having the frame B, with its upper portion formed of segmental parts joined by the bolt S and provided with a vertically-adjustable support, A, and a rising and falling head with a sliding laterally-adjustable frame carrying a grinding-wheel, said parts being combined and operating substantially as described.

LYMAN O. ORTON.

Witnesses:
JOHN A. WIEDERSHEIM,
A. P. GRANT.